US012676817B2

(12) United States Patent
Wang et al.

(10) Patent No.: US 12,676,817 B2
(45) Date of Patent: \*Jul. 7, 2026

(54) SYSTEM AND METHODS FOR SUPPORTING LOW MOBILITY DEVICES IN NEXT GENERATION WIRELESS NETWORK

(71) Applicant: INTERDIGITAL PATENT HOLDINGS, INC., Wilmington, DE (US)

(72) Inventors: Guanzhou Wang, Brossard (CA); Saad Ahmad, Montreal (CA); Mahmoud Watfa, Saint Leonard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 235 days.

This patent is subject to a terminal disclaimer.

(21) Appl. No.: 18/394,521

(22) Filed: Dec. 22, 2023

(65) Prior Publication Data

US 2024/0205150 A1     Jun. 20, 2024

Related U.S. Application Data

(63) Continuation of application No. 16/088,380, filed as application No. PCT/US2017/025046 on Mar. 30, 2017, now Pat. No. 11,855,892.

(Continued)

(51) Int. Cl.
H04L 45/741       (2022.01)
H04L 45/745       (2022.01)
H04W 40/24        (2009.01)

(52) U.S. Cl.
CPC .......... H04L 45/741 (2013.01); H04L 45/745 (2013.01); H04W 40/246 (2013.01)

(58) Field of Classification Search
CPC ..... H04L 45/741; H04L 45/745; H04L 45/74; H04W 40/246
See application file for complete search history.

(56) References Cited

U.S. PATENT DOCUMENTS 7,339,895 B2     3/2008   Ozaki et al.
7,360,078 B1     4/2008   Lebouill
(Continued)

FOREIGN PATENT DOCUMENTS

CN        102065469       5/2011
CN        102957614       3/2013
(Continued)

OTHER PUBLICATIONS

Ericsson, "Levels of mobility support for mobility management," Sa WG2 Meeting #113AH, S2-160982, Sophia Antipolis, France (Feb. 23-26, 2016).

(Continued)

*Primary Examiner* — Ivan O Latorre
(74) *Attorney, Agent, or Firm* — Volpe Koenig

(57)          ABSTRACT

A system and apparatus for addressing the different types of mobility of a wireless transmit/receive unit (WTRU) in a network. A radio access network (RAN) may send a request for configuration information to a gateway device including a device ID of a WTRU, a service ID, and a RAN address. Once the RAN receives configuration information from the gateway device including a forwarding table, the RAN may be prepared to receive non-IP data from a WTRU including a routing tag. The routing tag may be based on the device ID of a WTRU and service ID. The RAN may transmit the non-IP data received from the WTRU to the gateway device over a routing path based on the routing tag and a forwarding table where the non-IP data is forwarded on to its detention, such as another WTRU or an Application Server.

10 Claims, 11 Drawing Sheets

Related U.S. Application Data

(60) Provisional application No. 62/315,398, filed on Mar. 30, 2016.

(56) References Cited

U.S. PATENT DOCUMENTS

| | | | |
|---|---|---|---|
| 7,697,422 B1 | 4/2010 | Arad et al. | |
| 7,792,097 B1 | 9/2010 | Wood et al. | |
| 8,908,666 B2 | 12/2014 | Nixon et al. | |
| 9,179,443 B2 | 11/2015 | Lee et al. | |
| 9,386,097 B2 | 7/2016 | Noll et al. | |
| 10,581,813 B2 | 3/2020 | Watfa et al. | |
| 2004/0081120 A1 | 4/2004 | Chaskar | |
| 2009/0168758 A1 | 7/2009 | Apelqvist et al. | |
| 2009/0172171 A1 | 7/2009 | Amir | |
| 2010/0246536 A1* | 9/2010 | Della-Torre | H04L 65/1036 |
| | | | 370/335 |
| 2011/0213888 A1 | 9/2011 | Goldman et al. | |
| 2012/0203909 A1 | 8/2012 | Kavanaugh et al. | |
| 2013/0070745 A1 | 3/2013 | Nixon et al. | |
| 2015/0094037 A1 | 4/2015 | Jung et al. | |
| 2015/0124827 A1 | 5/2015 | Rangaraman et al. | |
| 2015/0334015 A1 | 11/2015 | Savolainen et al. | |
| 2016/0105915 A1 | 4/2016 | Zhang et al. | |
| 2017/0332217 A1 | 11/2017 | Youtz et al. | |
| 2017/0374694 A1 | 12/2017 | Kotecha et al. | |
| 2018/0176340 A1* | 6/2018 | Huang | H04L 61/2596 |
| 2018/0206093 A1 | 7/2018 | Jain et al. | |
| 2018/0220478 A1 | 8/2018 | Zhu et al. | |
| 2018/0295556 A1 | 10/2018 | Baek et al. | |
| 2019/0028337 A1* | 1/2019 | Ryu | H04W 8/02 |
| 2020/0304409 A1* | 9/2020 | Wang | H04W 40/246 |
| 2024/0205150 A1* | 6/2024 | Wang | H04L 45/741 |

FOREIGN PATENT DOCUMENTS

| | | | |
|---|---|---|---|
| CN | 101808145 B | 11/2014 | |
| CN | 101605087 | 12/2016 | |
| EP | 1 345 357 | 9/2003 | |
| WO | 2013088323 A2 | 6/2013 | |
| WO | 2017/027071 | 2/2017 | |

OTHER PUBLICATIONS

Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP Ts 23.401 V13.0.0 (Sep. 2014).

Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP Ts 23.401 V13.6.1 (Mar. 2016).

Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP Ts 23.401 V13.10.0 (Mar. 2017).

Third Generation Partnership Project, "Technical Specification Group Services and System Aspects; General Packet Radio Service (GPRS) enhancements for Evolved Universal Terrestrial Radio Access Network (E-UTRAN) access (Release 14)," 3GPP Ts 23.401 V14.3.0 (Mar. 2017).

Third Generation Partnership Project, "Technical Specification Group Services and System Aspects; Study on Architecture for Next Generation System (Release 14)," 3GPP Tr 23.799 V0.3.0 (Mar. 2016).

Third Generation Partnership Project, "Technical Specification Group Services and System Aspects; Study on Architecture for Next Generation System (Release 14)," 3GPP Tr 23.799 V14.0.0 (Dec. 2016).

Third Generation Partnership Project, "Technical Specification Group Services and System Aspects; System Architecture for the 5G System; Stage 2 (Release 15)," 3GPP Ts 23.501 V0.3.1 (Mar. 2017).

Third Generation Partnership Project, "Technical Specification Group Services and System Aspects; Architecture enhancements to facilitate communications with packet data networks and applications (Release 13)," 3GPP Ts 23.682 V13.5.0 (Mar. 2016).

Third Generation Partnership Project, "Technical Specification Group Services and System Aspects; Study on architecture enhancements for Cellular Internet of Things (Release 13)," 3GPP Tr 23.720 V13.0.0 (Mar. 2016).

Third Generation Partnership Project, "Technical Specification Group Services and System Aspects; Feasibility Study on New Services and Markets Technology Enablers; Stage 1 (Release 14)," 3GPP Tr 22.891 V14.0.0 (Mar. 2016).

Third Generation Partnership Project, "Technical Specification Group Services and System Aspects; Feasibility Study on New Services and Markets Technology Enablers; Stage 1 (Release 14)," 3GPP Tr 22.891 V14.2.0 (Sep. 2016).

Third Generation Partnership Project, "Technical Specification Group Services and System Aspects; Architecture enhancements to facilitate communications with packet data networks and applications (Release 13)," 3GPP Ts 23.682 V13.8.0 (Dec. 2016).

Third Generation Partnership Project, "Technical Specification Group Services and System Aspects; Architecture enhancements to facilitate communications with packet data networks and applications (Release 14)," 3GPP Ts 23.682 V14.3.0 (Mar. 2017).

Third Generation Partnership Project, "Technical Specification Group Services and System Aspects; Architecture enhancements to facilitate communications with packet data networks and applications (Release 15)," 3GPP Ts 23.682 V15.0.0 (Mar. 2017).

Third Generation Partnership Project, "Technical Specification Group Services and System Aspects; Procedures for the 5G System; Stage 2 (Release 15)," 3GPP Ts 23.502 V0.2.0 (Feb. 2017).

* cited by examiner

SYSTEM AND METHODS FOR SUPPORTING LOW MOBILITY DEVICES IN NEXT GENERATION WIRELESS NETWORK

CROSS REFERENCE TO RELATED APPLICATIONS

This application is a continuation of U.S. patent application Ser. No. 16/088,380 filed Sep. 25, 2018, which will issue as U.S. Pat. No. 11,855,892 on Dec. 26, 2023, which is the U.S. National Stage, under 35 U.S.C. § 371 of International Patent Application No. PCT/US2017/025046 filed on Mar. 30, 2017 which claims the benefit of 62/315,398 filed on Mar. 30, 2016, the contents of which are hereby incorporated by reference herein.

BACKGROUND

In wireless communication a wireless transmit/receive unit (WTRU) may travel from one radio access network (RAN) to another. Legacy systems may not adequately address varying degrees of mobility of a WTRU and the resulting consequences of such mobility. For instance, the mobility of the WTRU may be stationary or it may move minimally and infrequently. Legacy systems may not fully address such mobility in the design, handling, and configuration of wireless networks.

SUMMARY

A method and system for supporting non-IP data routing for low mobility devices in a next generation wireless network is disclosed. The data routing includes performing non-IP data routing within a 3GPP network and IP data routing outside the 3GPP network. The data routing is performed in an Ingress/Egress GW at the border of the networks, wherein the Ingress/Egress GW translates between non-IP data and IP packets. The Egress GW transforms non-IP data to IP packet by allocating, with help of GW Controller, temporary device IP address to the device and maintains the mapping between the Device ID and the temporary device IP. In the downlink, the Ingress GW transforms IP packets to non-IP data by looking up the device's Device ID using stored mapping information. The routing path is established within the 3GPP network using SDN-based technology and a Device ID/Service ID combination is used as the routing tag.

Additionally, the system and apparatus addresses the different types of mobility of a wireless transmit/receive unit (WTRU) in a network. A radio access network (RAN) may send a request for configuration information to a gateway device including a device ID of a WTRU, a service ID, and a RAN address. Once the RAN receives configuration information from the gateway device including a forwarding table, the RAN may be prepared to receive non-IP data from a WTRU including a routing tag. The routing tag may be based on the device ID of a WTRU and service ID. The RAN may transmit the non-IP data received from the WTRU to the gateway device over a routing path based on the routing tag and a forwarding table where the non-IP data is forwarded on to its detention, such as another WTRU or an Application Server.

BRIEF DESCRIPTION OF THE DRAWINGS

A more detailed understanding may be had from the following description, given by way of example in conjunction with the accompanying drawings wherein.

DETAILED DESCRIPTION

Figure 1A:
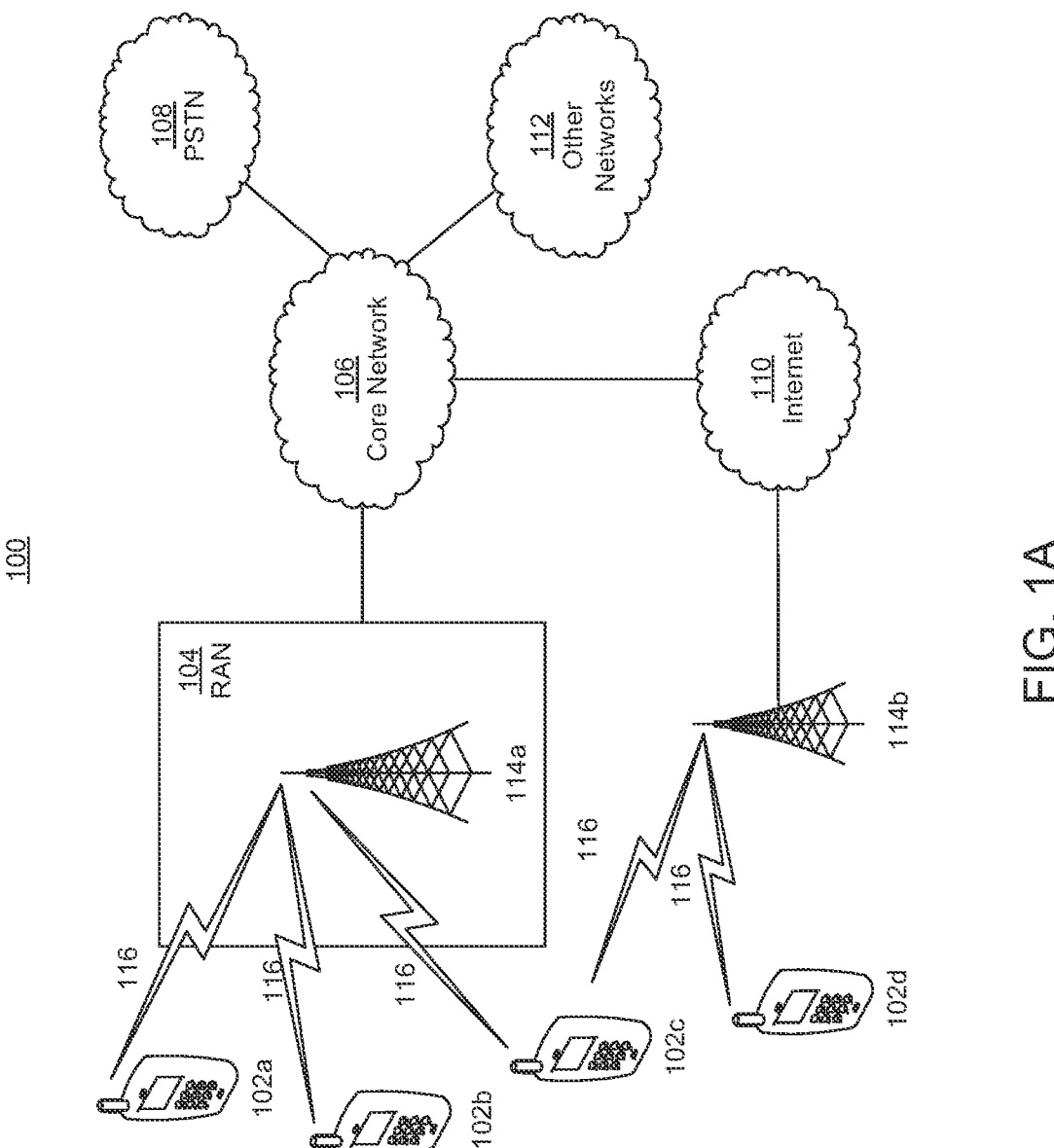
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, an Internet of Things device, a sensor, a server, a collection of computers such as for cloud computing, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the Radio Access Network (RAN) 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infra-red (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104, and more specifically one or more nodes or elements in the RAN 104, may be in communication with the core network 106, which may be any type of network configured to provide voice, data, applications, and/or voice over internet protocol (VOIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
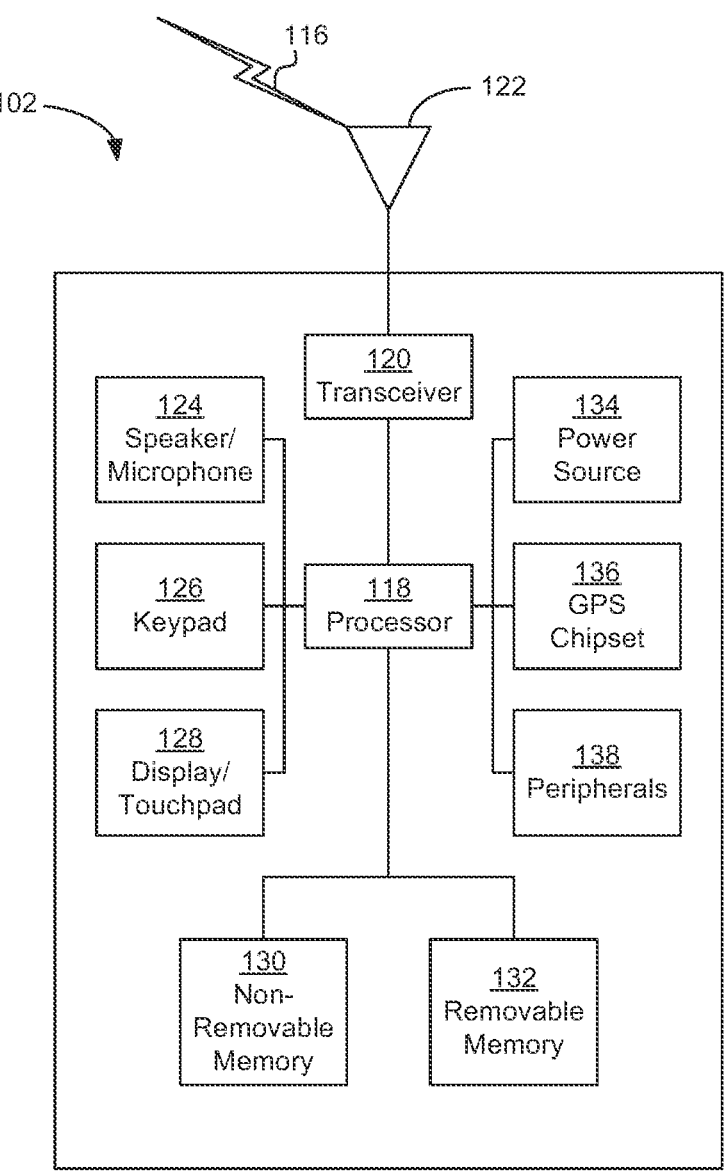
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
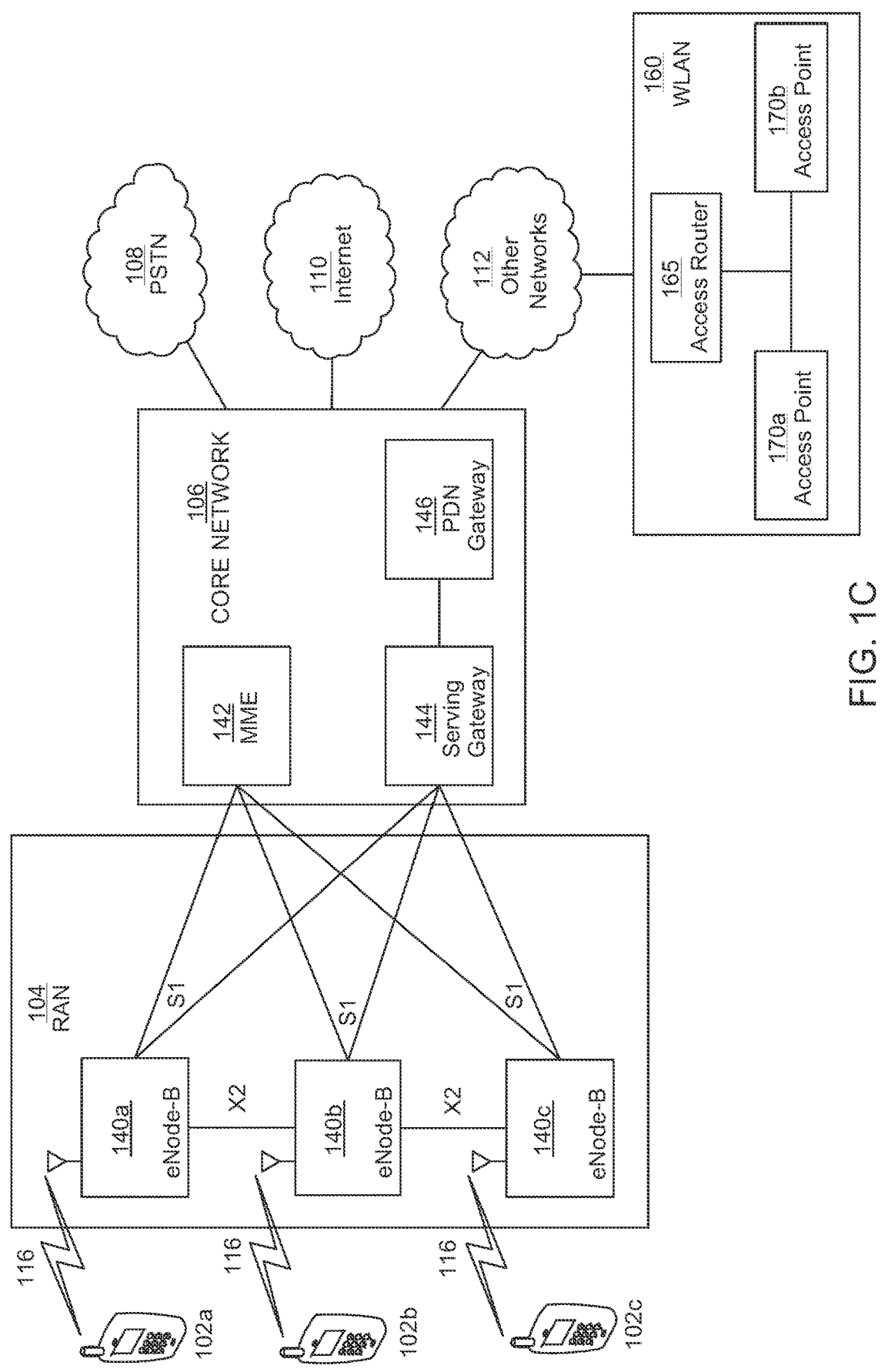
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Figure 2:
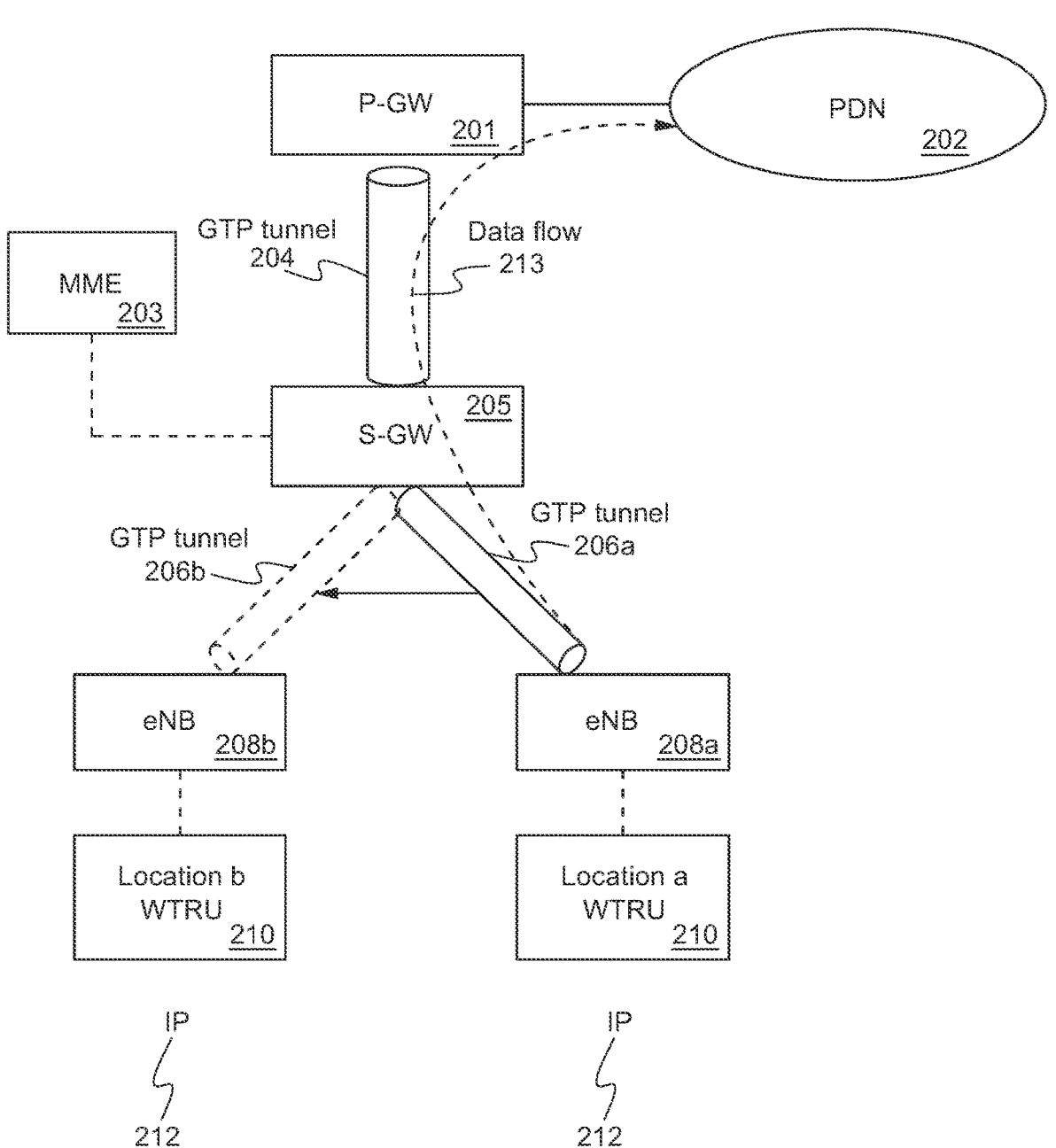
FIG. 2 is a system diagram of an example architecture for GTP-based mobility support in LTE EPC.

FIG. 2 shows an example architecture for Gateway Tunnel Protocol (GTP)-based mobility support in LTE Evolved Packet Core (EPC). The mobility management framework of EPC is designed around the "always-on" principle and is built on the network-controlled mobility protocol GTP. In one example there may be data flow 213 back and forth between a WTRU 210 at location a to a PDN 202. In the example architecture as shown in FIG. 2 there may also be an MME 203 and S-GW 205 that assist in the data flow 213. The WTRU 210 is attached to a mobility anchor, such as a P-GW 201, which is a centralized network entity and remains attached to the same point when the WTRU 210 moves around. The WTRU 210 is allocated an IP address 212 by the P-GW 201 and this IP address 212 is used as the identifier and address locator for WTRU 210. GTP tunnels 206a, 206b, and 204 are established between the mobility anchor and the WTRU's serving access network, such as eNB 208a and 208b. When WTRU 210 moves in the network from location a to location b and triggers the serving access network changes, such as the inter-eNB in-session handover or the Tracking Area Update that involves S-GW reallocation, the network will manage/move the WTRU's 210 GTP tunnels to "follow" the WTRU's current location, such as going from GTP 208a at location a to GTP 208b at location b. As long as the incoming data flow 213 travels through the established GTP tunnels 204 and

206b after the move to location b, it will find the destined WTRU 210. The WTRU's IP address 212 remains unchanged when moving across access networks and the WTRU 210 is unaware of the tunnel management.

Data routing within a Third Generation Partnership Project (3GPP) network follows the established GTP tunnels as shown in FIG. 2. WTRU's GTP tunnels are identified by GTP Tunnel IDs in a 3GPP network. For example, for the uplink between the eNB 208a and S-GW 205 a GTP Tunnel ID "UL S1-TEID" may be assigned to the GTP tunnel 206a and for the uplink between the S-GW 205 and P-GW 201 a GTP Tunnel ID "UL S5-TEID" may be assigned to the GTP tunnel 204. The Tunnel IDs are carried in the header of each GTP-U data so the GWs can easily find out the next hop for the data routing.

The mobility framework as discussed in the example of FIG. 2 may be utilized and optimized for human communication where a WTRU is a smartphone and assumes the smartphone may need to roam at a certain speed. One goal of the system design may be to achieve service continuity when a WTRU is mobile at high speeds. There is no differentiation in mobility support for WTRUs that have various mobility levels. A universal mobility framework is applied to all WTRUs, regardless of their mobility levels or whether they need service continuity or not.

In the discussion for mobility framework of a next generation network, the requirement for "mobility on demand" is emphasized. There are at least two use cases for mobility on demand. In a first use case, WTRUs may comprise different device types and uses, and may have different mobility levels (e.g., some WTRUs may move at high speed while other WTRUs may follow nomadic patterns or may be stationery) and different mobility levels may require different mobility support. In a second use case, different applications and services running on a WTRU may require different mobility support. For example, some applications may handle the mobility events on the application layer and would not need the traditional network layer mobility support.

In order to support "mobility on demand" the following considerations may need to be addressed: how to support mobility on demand and different types of mobility; the types of mobility a system should support (e.g. high mobility, medium mobility, low mobility, no mobility and mobility on demand); how to determine the type of WTRU mobility (e.g. by what characteristics/method); and/or how to obtain information (e.g. application's needs, WTRU capabilities, used services) in order to determine the appropriate type of mobility of the WTRU.

Examples of different "mobility levels" or mobility may include any one or a combination of the following: mobility supported over a given area within a single RAN node; a mobility level supported within a single RAN node (i.e. equivalent to an eNodeB); mobility supported between RAN nodes in a RAN registration area (i.e. equivalent to a TA in EPC); mobility supported in the service area of a control plane or user plane CN entity (i.e. equivalent to an MME pool area or a Serving GW service area in an EPC); mobility supported within a given RAT or combination of RATs integrated on the RAN level (e.g. LTE and 5G RAT); or mobility supported between more than one access technologies.

In summary, the mobility framework in next generation network may need to address different mobility levels and provide appropriate solutions. In particular, the mobility support for low mobility WTRUs or stationary WTRUs may need to be accommodated in a next generation network.

Within a GTP-based 3GPP network, data routing follows pre-established GTP tunnels. The tunnel IDs are included in each GTP-U header so GWs are able to easily find the next hop.

Alternative methods compared to GTP based mobility management may be used for low mobility WTRUs because IP anchoring may not be necessary in situations where WTRUs are stationary or only move within a very limited area, especially when the WTRUs may not require perfect service continuity. Additionally, establishing GTP tunnels may require a significant amount of signaling and there may be a problem if there are a high number of low mobility WTRUs. Data routing mechanisms within a 3GPP core network for low mobility WTRUs should be addressed because GTP is unlikely to be used for mobility management for low mobility WTRUs and when GTP tunnels are not available.

For IP data routing, alternative routing mechanisms may be used for low mobility WTRUs. It is possible that one or more low mobility WTRUs may also use non-IP data communication. For example, one or more low mobility WTRUs may be low cost devices that do not have an IP stack. Also, an IP packet may have a large header overhead which may not be desirable for a large amount of low mobility WTRUs. As a result, methods and systems as discussed herein may be used to support non-IP data routing for low mobility WTRUs.

In one embodiment routing data may be based on a non-IP address within a 3GPP network. In such an embodiment the non-IP data may still be routed over an IP network because data infrastructure is mostly IP based outside a 3GPP network. Such an embodiment may follow general principles of the next generation core network, including 5G and New Radio technologies, such as complete CP/UP separation, virtualized network functions, network slicing, and software defined networking (SDN) based routing. Also, such an implementation may be efficient and not incur much overhead.

In one example data routing may be addressed by dissecting it into two sections: non-IP routing within a 3GPP network and IP routing outside the 3GPP network. An Ingress/Egress GW at the border of these two sections may translate between non-IP data and IP packets. The Ingress/Egress GW may transform non-IP data to IP packets by allocating, with the help of a GW Controller, temporary device IP addresses to WTRUs and maintain mapping between a Device ID and the temporary device IP. In the downlink, the Ingress/Egress GW may transform IP packets to non-IP data by looking up a WTRU's Device ID using stored mapping information. In one example a routing path within the 3GPP network may be established using SDN-based technology and the Device ID/Service ID combination is used as the routing tag.

Figure 3:
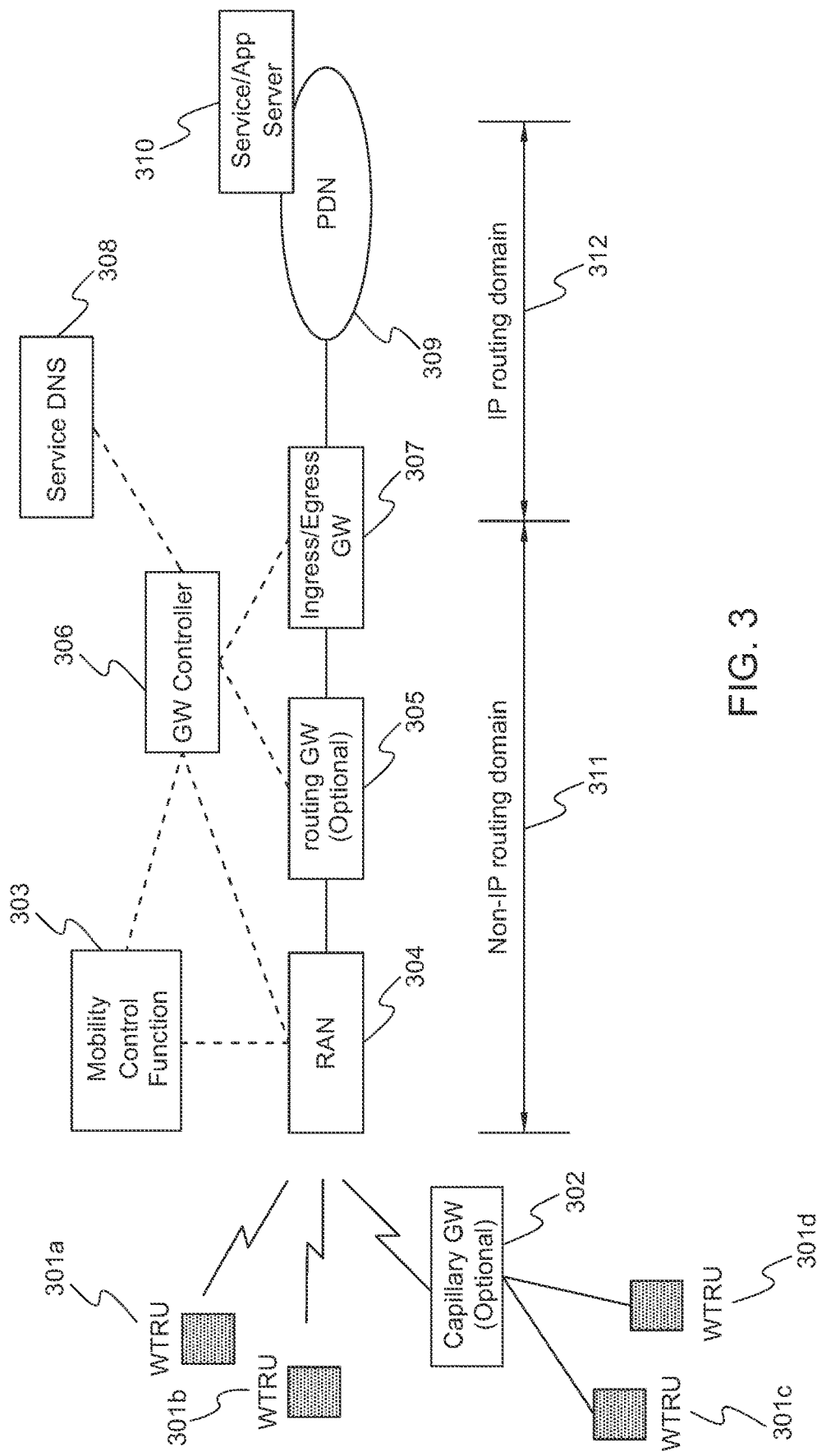
FIG. 3 is a system diagram of an example architecture for supporting non-IP data routing.

FIG. 3 shows an example architecture for supporting non-IP data routing for a non-IP WTRU. In FIG. 3 the whole routing path is divided into two parts: a non-IP routing part 311 and an IP routing part 312. The non-IP routing part 311 is within a 3GPP network, between the RAN 304 (i.e. a node or element) or Access Gateway and the Ingress/Egress GW 307. The IP routing part 312 is between the 3GPP Ingress/Egress GW 307 and the destination, such as a Service/Application Server 310 or a peer WTRU (not shown) of the outside PDN 309. WTRUs 301a-d may send non-IP data through the non-IP routing domain part 311 and an IP routing domain part 312 to a destination such as a Service/App Server 310.

In FIG. 3 the architecture for non-IP data routing assumes the infrastructure network outside the 3GPP network is IP-based. However, if the infrastructure network outside the 3GPP network is non-IP based (e.g., it uses a different non-IP protocol than that within a 3GPP network), the same systems and methods described herein may be applied.

As seen in FIG. 3, each non-IP WTRU 301a-d is assigned an Ingress Gateway 307, which receives all the incoming data from outside a PDN 309 and forwards it to a non-IP WTRU such as 301a, and an Egress Gateway 307, which terminates all the outgoing data from the non-IP WTRU 301a and forwards it to the destination outside the PDN 307. The Ingress/Egress GW 307 may be separate (not shown) or combined in a physical entity.

The Ingress/Egress GW 307 of the non-IP WTRU 301a is assigned by the GW Controller 306. The GW Controller 306 may also select one or more other routing GWs 305 to form a non-IP routing path between the RAN 304 and the Ingress/Egress GW 307. The GW Controller 306 may also configure, possibly using SDN-based APIs, routing tables in the other routing GWs 305 that are in the non-IP routing path to make sure that the non-IP data is routable between the RAN 304 and the Ingress/Egress GW 307. The GW Controller 306 may need to query a Service DNS 308 to obtain the IP of the destination Service/App Server 310 in the outside PDN 309.

The non-IP WTRUs 301a & 301b may directly connect to the network or indirectly connect through a Capillary GW to the network such as WTRUs 301c & 301d. The non-IP WTRUs 301a-d may register with the local RAN 304 or the Mobility Control Function 303 in the core network. After the device registration, the RAN 304 or the Mobility Control Function 303 interacts with the selected GW Controller 306 to establish the non-IP routing path.

One or more of the main functions described in relation to FIG. 3 may be instances of virtualized network functions, and the functions may be organized into a network slice that is targeted for non-IP services. Further, the GWs' control plane functions and user plane functions may not be separated as illustrated in FIG. 3, but instead may reside in one GW entity.

Also in FIG. 3, at the boundary of the non-IP routing part 311 and the IP routing part 312, the non-IP data may be transformed to IP data or vice-versa by the Egress/Ingress GW 307, possibly with the control of the GW Controller 306.

Figure 4:
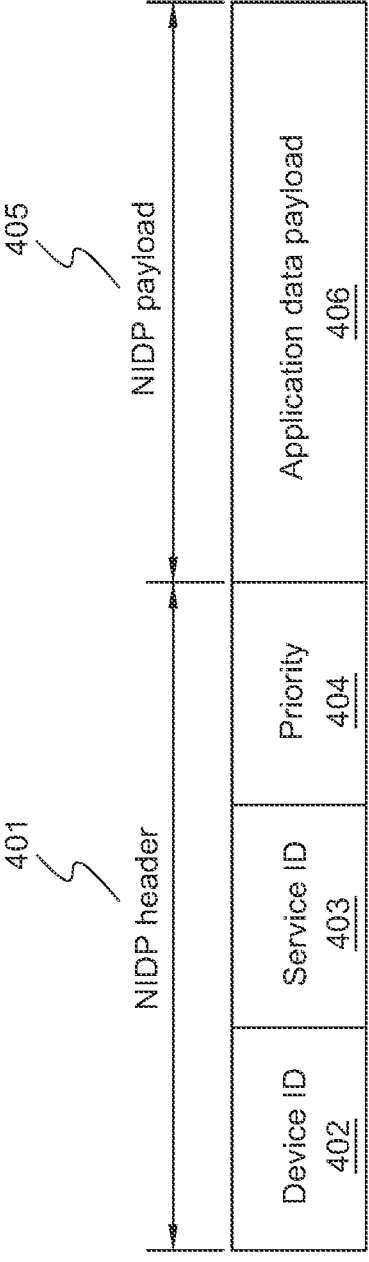
FIG. 4 shows an example of a high level data protocol stack for supporting a non-IP data routing architecture.

FIG. 4 shows an example of a non-IP data protocol/format (NIDP) data format. A NIDP may be defined so that the forwarding tables in the routing path may be established following the protocol. The NIDP 401 header may contain the Service ID 403 or the combination of the Device ID 402 and Service ID 403 as the routing tag. To enable non-IP data forwarding based on the NIDP header 401, the Device ID and Service ID should be included in each non-IP data from a WTRU. Service priority information 404 may also be included in the NIDP header 401. The NIDP header 401 may be followed by the NIDP payload 405 comprising of an application data payload 406. A more complex header design than the example NIDP header shown in FIG. 4 may include security or ciphering information.

Figure 5:
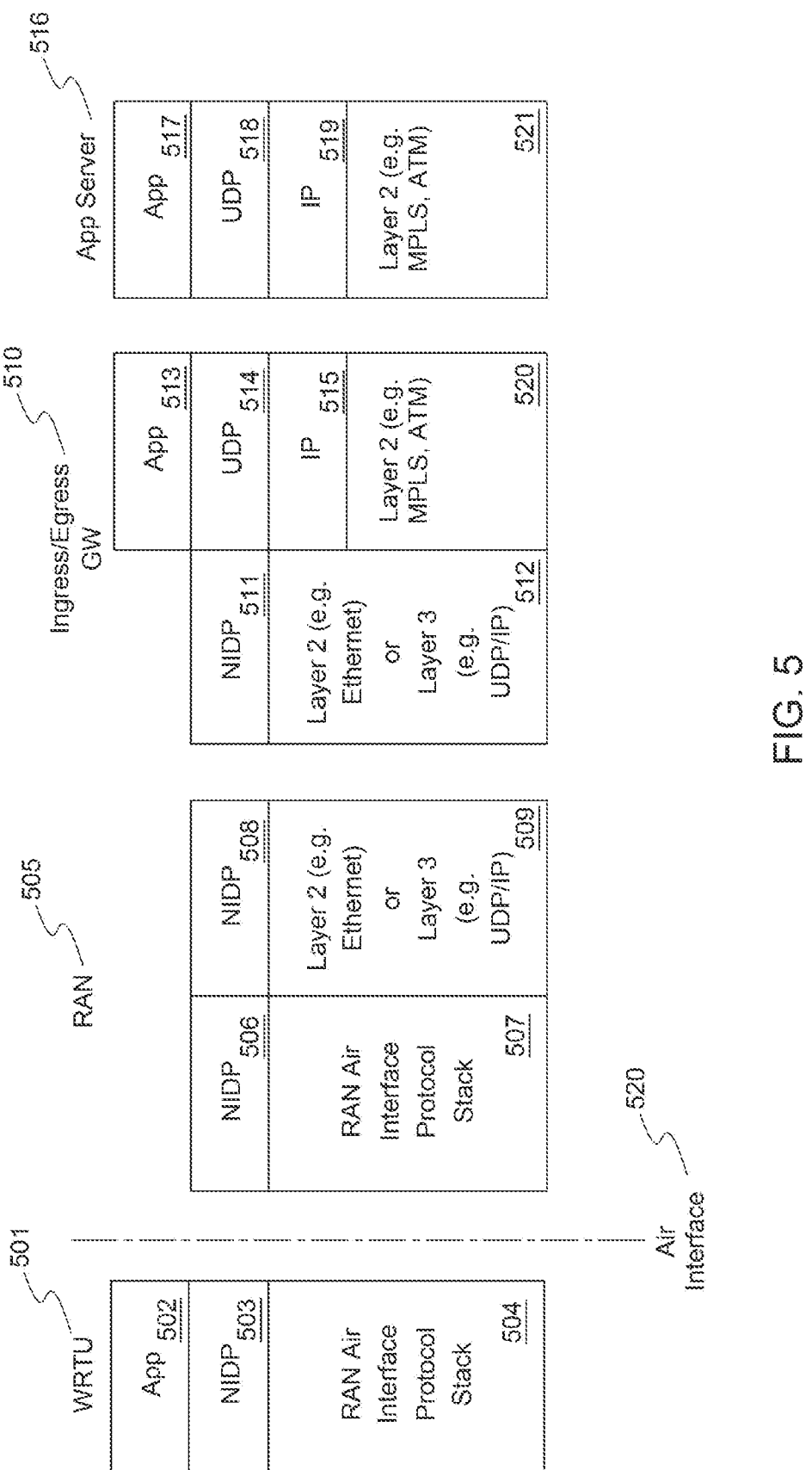
FIG. 5 shows an example of a protocol stack for non-IP data routing.

FIG. 5 shows an example of a high level data protocol stack for supporting a non-IP data routing architecture such as that shown in FIG. 3. WTRU 501 may have an App 502 that must communicate data to the App server 516 through a RAN 505 and an Ingress/Egress GW 510. SDN-based routing, such as Openflow routing, may be used for the non-IP data routing part within a 3GPP core network. Each gateway may have a separate non-IP data routing or forwarding table. The WTRU 501 may also have NIDP 503 and RAN Air Interface 504. The WTRU 501 communicates over an air interface 520 with the RAN 505. A GW Controller may configure each GW in the path, from the RAN 505 to the selected Egress GW 510, with a forwarding table entry that points the data to the proper next hop. The Ingress/Egress GW 510 may have the following protocol stack layers: App 513, NIDP 511, UDP 514, Layer 2 or Layer 3 512, IP 515, and Layer 2 520 and may comprise any technology that can carry IP over it, such as MPLS, ATM, and the like. The App Server 516 may have the following protocol stack layers: App 517, UDP 518, IP 519, and Layer 2 521 and may comprise any technology that can carry IP over it, such as MPLS, ATM, and the like.

Figure 6:
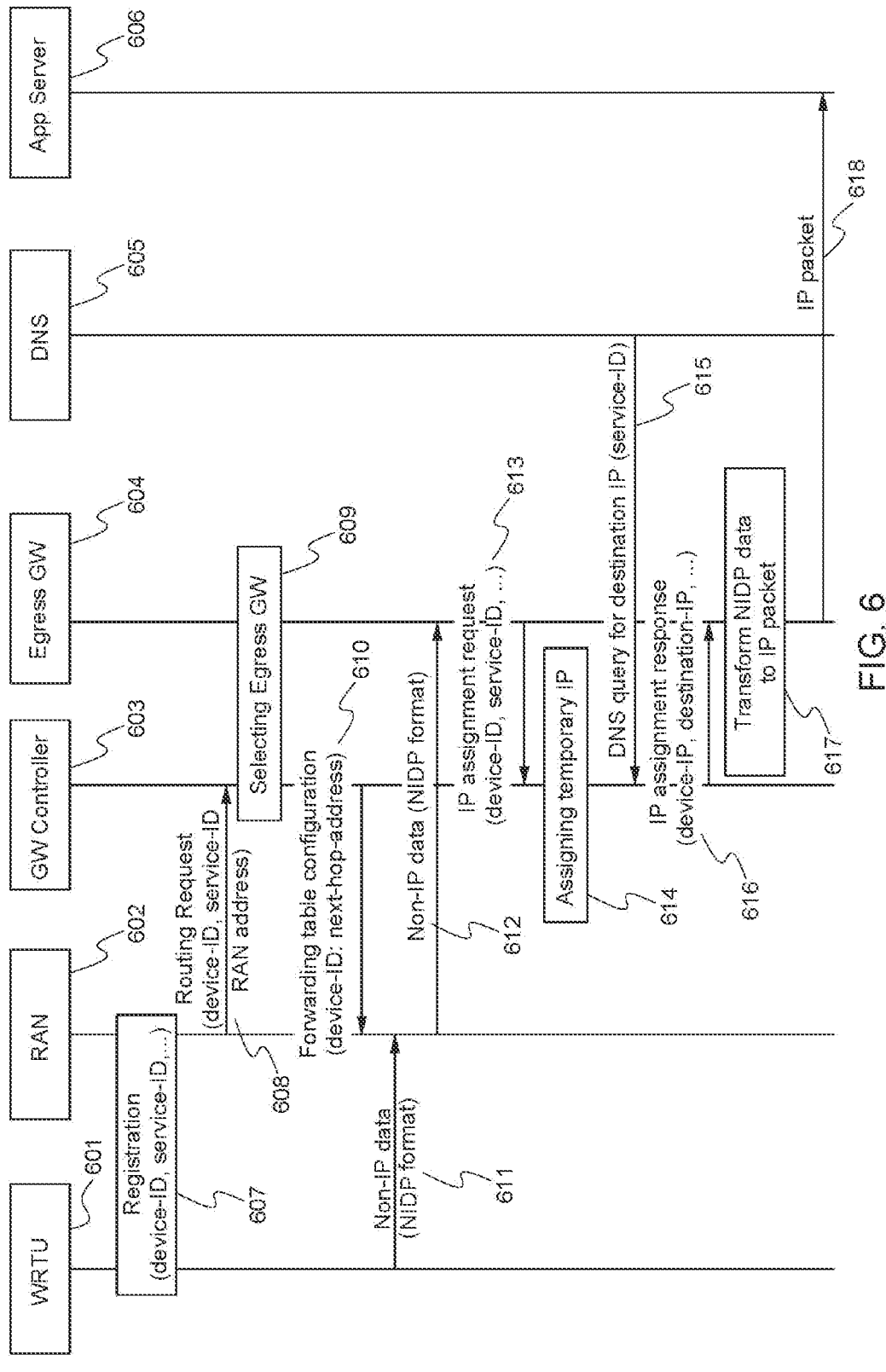
FIG. 6 shows an example method of the selection of different Egress GWs for different non-IP data services.

FIG. 6 shows an example method for performing outgoing non-IP data routing. For this example, it is assumed that a non-IP WTRU has already selected the network/network slice and the RAN.

At 607, the non-IP WTRU 601 registers with the network or network slice. Either the RAN 602 or certain Mobility Control Function (MCF) in the core network may handle such a registration. The registration identifies the Device ID, together with its location to the network.

At 608, upon receiving the WTRU's 601 registration request, the RAN 602 or MCF may select a GW Controller 603 and request the GW Controller 603 to establish the non-IP data routing path for the WTRU 601 which may include information like the Device ID, Service ID, RAN address, and the like.

At 609, the GW Controller 603 selects the Egress GW 604 and any other necessary routing GWs. At 610 the GW Controller 603 also configures those GWs (including the RAN 602 or access gateway) with Device-ID based forwarding tables; the forwarding tables may comprise mappings between a Device-ID and the next hop address such that a GW can determine the next hop address by looking up the Device ID in the table.

At 611 the WTRU 601 sends non-IP data to the RAN 602, the NIDP data header provides the Device ID which will be used by the routing GWs to forward the data to the Egress GW 604.

At 612 the non-IP data arrives at the Egress GW 604, and if the Egress GW 604 has no routing context for the Device ID, then at 613 the Egress GW 604 makes a request for a temporary IP address for the WTRU 601 to the GW Controller 603. At 614 the GW Controller 603 assigns the requested temporary IP address to the WTRU 601. At 615 the GW Controller also queries the DNS server 605 using the service ID that is provided in the NIDP data to obtain the destination IP address.

At 616 the Egress GW 604 receives an IP assignment response from the GW Controller 603, containing information such as the temporary device IP address, destination IP, and the like. At 617 the Egress GW 604 uses this temporary device IP address and the destination IP to transform the NIDP data into an IP routable packet, and then at 618 the Egress GW 604 forwards the IP packet to the destination server 606.

In view of the process as explained in FIG. 6, one purpose of device registration may be for a WTRU to provide the network with the "Device ID" and "Service ID" of the WTRU which will form the routing tags to be used in non-IP data routing. Device registration may also identify the WTRU's location, e.g. in the form of the connected RAN or access gateway's Layer 2 address. The location information may be used by the GW Controller to configure the route for the incoming data.

The "Device ID" and "Service ID" could take many forms: it could be a text string, an URI, IMEI number, a public cryptography key (as considered in relation to the Host Identity Protocol (HIP)), or the like.

Note that the WTRU may indicate one or multiple Service IDs in the registration and that priorities may also be linked with each Service ID.

Besides the Device ID and Service ID(s), other necessary capability indications such as "low-mobility" indication, "non-IP data device" indication, "outgoing data only" flag, "incoming data only" flag and "outgoing and incoming data" flag may also be signaled to the network during the registration. The WTRU may also report its reachability related parameters such as Power Saving Mode or extend DRX settings.

Device registration may be handled by the RAN or other network entities such as Mobility Control Function. There may also be other procedures such as device authentication, authorization procedure combined with the device registration procedure.

Figure 7:
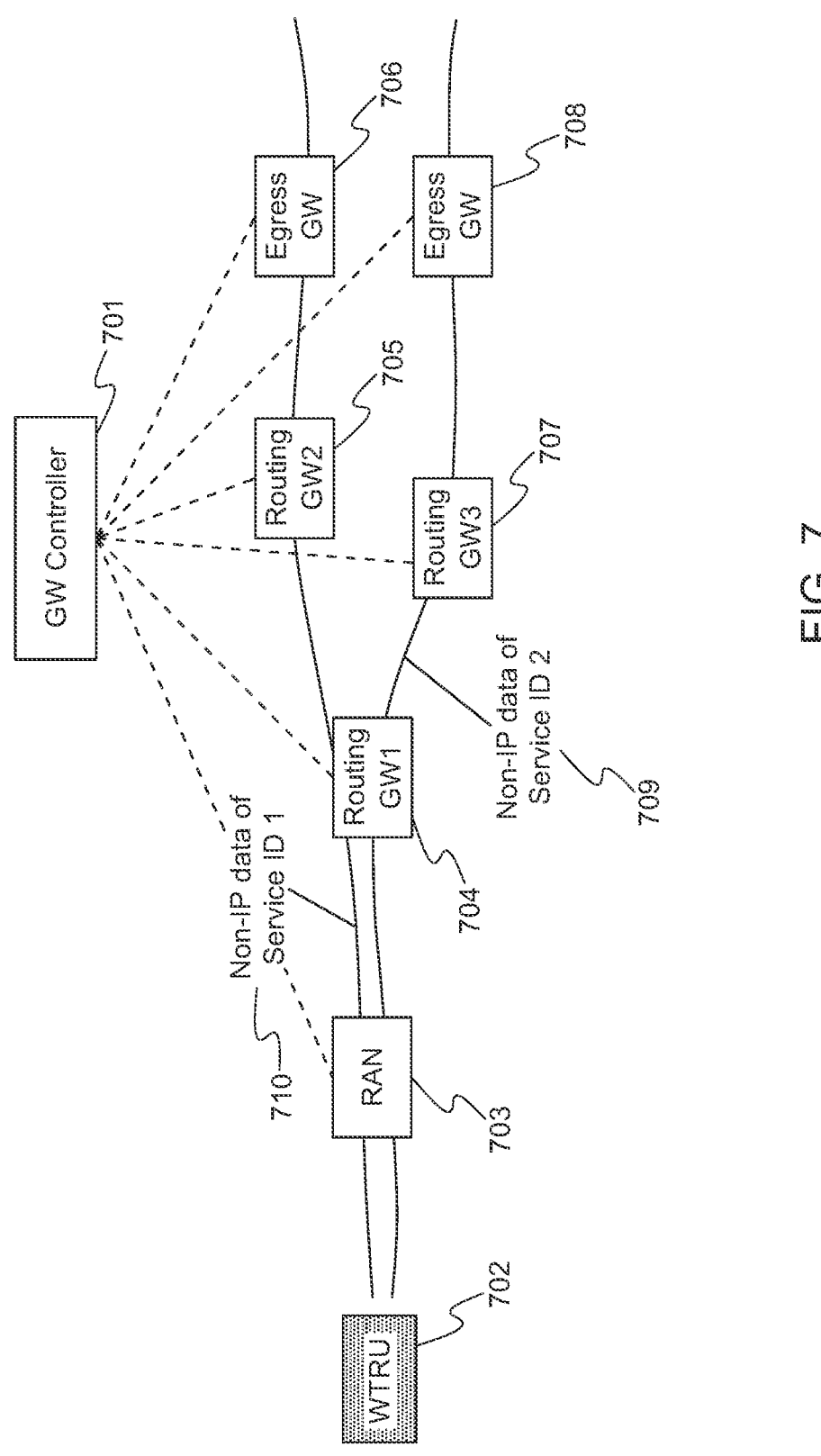
FIG. 7 shows an example of a non-IP data protocol/format (NIDP) data format.

FIG. 7 shows an example of the selection of different Egress GWs for different non-IP data services. Each non-IP WTRU 760 should to be assigned an Egress GW, such as Egress GW 706 or 708. An Egress GW may sit at the border between 3GPP core network and outside PDN as shown in FIG. 3. An Egress GW terminates the non-IP data transmission and transforms it into IP routable packets and forwards the packets to the destination in the IP network, as discussed herein.

The selection of an Egress GW, such as Egress GW 706 or 708, may be performed by the GW Controller 701, or other network entities/functions such as Mobility Control Function. In one embodiment the GW Controller 701 performs this task since the GW Controller 701 also needs to select other routing GWs between the RAN 703 and the selected Egress GW, as well as configure the routing tables in those GWs. If other entities/functions perform the Egress GW selection, the GW Controller 701 needs to be informed of the address of the selected GW.

The selection of the Egress GW may be triggered by device registration or some other procedure. Upon device registration, the RAN 703, or the MCF (not shown), may send a "routing request" to the GW Controller 701 and then the GW Controller 701 will select the Egress GW, such as Egress GW 706 or 708 and other necessary routing GWs between the RAN 703 and the selected Egress GW. The selection of the GWs may also be delayed until the WTRU 702 sends its first non-IP data.

The selection of an Egress GW may be based on the Service ID received from the routing request. It is possible that an Egress GW may not support all non-IP data services but a fraction of them, so the selected Egress GW should cater for the indicated Service ID. If multiple Service IDs are indicated, the GW Controller may select the same or different Egress GWs for each Service ID. The GW Controller 701 may also need to query the DNS for the IP address of the Device ID before it may select the Egress GW.

In one embodiment when the WTRU 702 sends non-IP data with Service ID1 710, the non-IP data is routed by the GW Controller through Routing GW1 704, Routing GW2 705, and arrives at the Egress GW 706 where it will be sent off to its ultimate destination using an IP service. In another embodiment when the WTRU 702 sends non-IP data with Service ID1 709 the non-IP data is routed by the GW Controller 701 to through Routing GW1 604, Routing GW2 707, and arrives at the Egress GW 708 where it will be sent off to its ultimate destination using an IP service.

In one embodiment, there may be a process for assigning a temporary device IP and performing Destination IP query. When NIDP data arrives at a Egress GW, the Egress GW may check whether it has the context for the Device ID and whether an IP address is available. If not, the Egress GW may request the GW Controller to assign a temporary IP address for that WTRU. The GW Controller may have its own IP address pool for this function. It may also utilize another entity such as a DHCP server for this purpose.

The GW Controller may also be requested to resolve the destination IP for the Service ID by utilizing a DNS service. The transport port numbers (e.g., UDP port) may also need to be obtained.

It is also possible that the GW Controller has already performed temporary IP allocation and destination IP resolution when the routing request is received for the WTRU, and stored them with the WTRU's context. The GW Controller will return this information to the Egress GW when requested.

The GW Controller may modify or release the WTRU's temporary IP upon certain conditions. For example, if the Ingress or Egress GW reports a long time of inactivity for the WTRU the GW Controller may release the temporary IP assignment and use it for another WTRU. The WTRU may or may not receive a network indication of the temporary IP address change depending on whether the application server can handle such an IP change.

It is also possible that the Egress GW may perform the IP address allocation and destination IP resolution on its own, without the help of the GW Controller.

In another embodiment, the assignment of a source IP address by the GW Controller node may be based on the service type or service ID included in the IP assignment request message. The GW Controller node may check the service ID included in the request message where the source IP is being requested and, in turn, the urgency or priority of the request acquired from this information. The IP address version (IPv4 or IPv6), type of IP address (temporary address or permanent IP address), and QoS associated with this IP address/connection (DSCP value) may then be decided by the GW Controller.

If the decision by the GW node is to assign a temporary IP address, some other parameters may need to be defined to clarify the scope of a temporary IP address, such as the validity of the temporary IP address. The Egress GW may be notified about the length of temporary IP address presence. The notification may be in terms of time units (e.g. seconds or minutes) or alternatively it may be in terms of a WTRU connection state where a particular IP address may be used as long as the WTRU is in connected mode. A new IP address may need to be requested every time the WTRU experiences a state transition between idle and connected modes.

Alternatively, the GW Controller may decide to assign a permanent IP address for some Service IDs or type. Low latency type services, such as health monitoring applications and V2X services, are some instances where the GW Controller may assign a permanent IP address. The permanent IP address may be valid during the life time of the device registration. As long as the WTRU is attached or registered to the network, the GWs may be able to use the same permanent source IP address for all the outgoing packets for that particular WTRU.

With the assigned temporary device IP address, the resolved destination IPs, and UDP port numbers, the Egress GW may transform the received NIDP data into IP packets, using the device IP as the source IP address, and forward them to the outside IP network.

Figure 8:
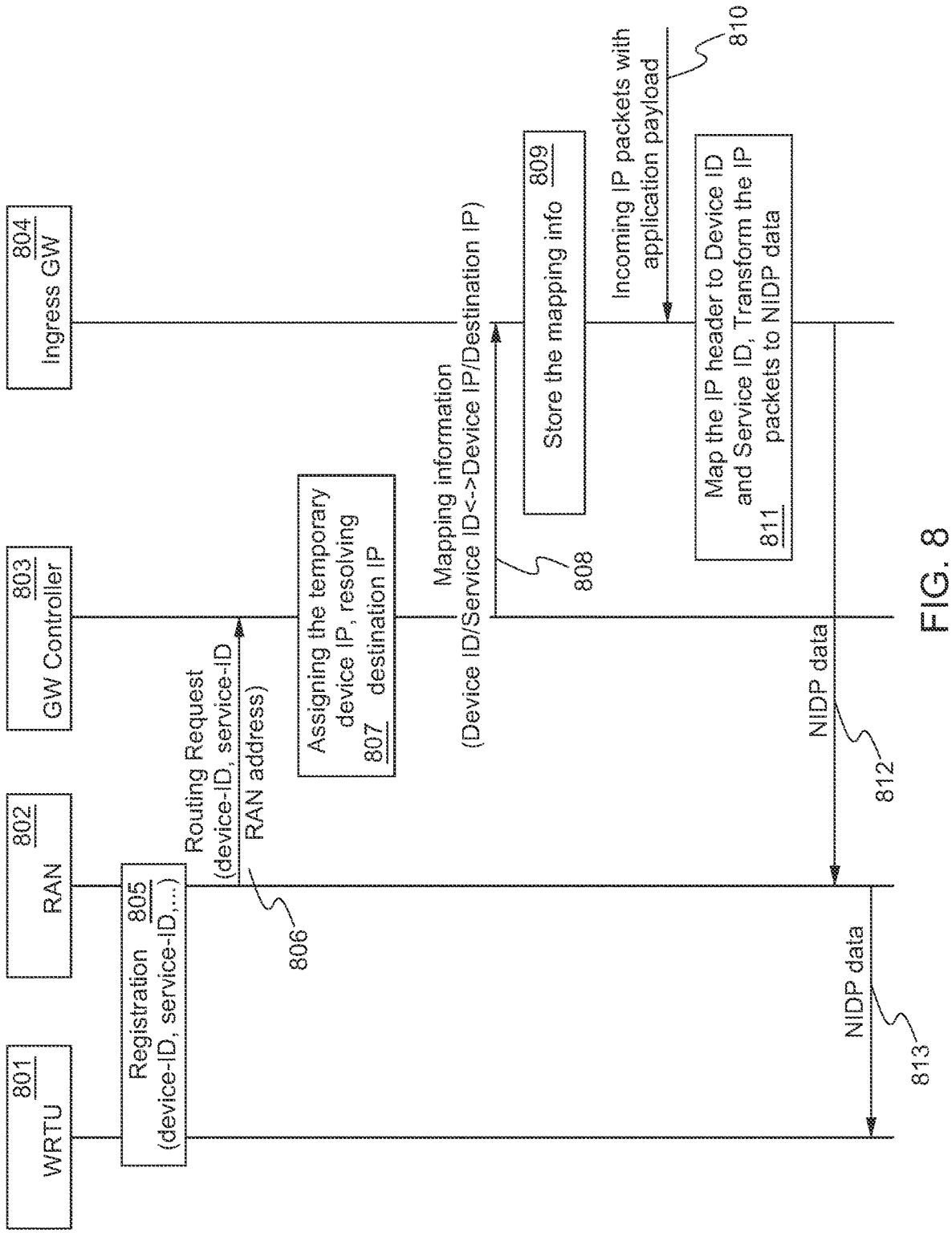
FIG. 8 shows an example method for performing incoming non-IP data routing.

FIG. 8 shows an example of a method for performing incoming non-IP data routing. If the WTRU 801 has sent outgoing data to the outside IP network, either to an application server or a peer WTRU 801, the incoming data should have the WTRU's temporary IP address as the destination address. If the WTRU 801 has not sent outgoing data before, there is no way for the server or other peer WTRUs to send IP packet to the 3GPP network. In this latter case the server may need to trigger the non-IP WTRU 801 to send outgoing data first, such as at 805 where the WTRU 801 sends an application registration message to the RAN 802 including the Device ID and the Service ID.

At 806 the RAN 802 sends a routing request to the GW Controller 803 with the information received in the application registration message as well as the RAN address. At 807 the GW Controller 803 may assign the temporary device IP and resolve the destination IP. At 808 this mapping information may then be sent to the Ingress GW 804 from the GW Controller 803. In one example the mapping information may include a concordance of Device ID/Service ID to Device IP/Destination IP. At 809 the Ingress stores this mapping information for use when information destined for the WTRU 801.

At 810 incoming data may come in for a non-IP WTRU 801 at the Ingress GW 804. The Ingress GW 804 may be implicitly selected after the temporary IP assignment as discussed herein. In one embodiment the Ingress GW is the same GW as the Egress GW, but in another embodiment a separate Ingress GW may also be possible. Other routing GWs (not shown) between the RAN 802 and the Ingress GW 804 for incoming data may also be selected together with the GW selections for outgoing data. Similarly, routing GWs for incoming data may or may not be the same as the routing GWs for the outgoing data. In other words, the routing path for incoming data may or may not be identical as the path for outgoing data.

The forwarding table configuration in the GWs for incoming data may also be performed together with the configuration for outgoing data. If this is not the case and a GW in the routing path cannot find the forwarding entry for the received incoming data, the GW may request the GW Controller 803 to update the forwarding table.

Also at 810 when the IP packets that carry the non-IP application data payload arrive at the Ingress GW 804, the Ingress GW 804 makes a reverse mapping at 811 from the IP header information (source IP address, destination IP address) to the Device ID and Service ID. The mapping information may be created at 809 when the temporary device IP address is assigned and stored in the Ingress GW 804. Using the Device ID and Service ID, at 812 the Ingress GW 804 may transform the receiving IP packets into NIDP data format and forward them to the RAN 802 following the pre-configured routing path. At 813 the RAN 802 completes the process by delivering the incoming data that was converted to NIDP data to the non-IP WTRU 801.

In another embodiment, IP address assignment service may be exposed to the Application Server. If the Application Server has a packet destined to a particular WTRU and is unware of the destination IP address, the Application Server may request the destination IP address via an API message through an exposure function. The exposure function may then contact the GW Controller to request the WTRU source IP address. The GW function may assign the WTRU a source IP address upon receiving this request from the exposure function. The newly assigned source IP address may then be sent to the exposure function by the GW Controller. An API response message may provide the IP address to the Application Server. When the Application Server sends the DL IP packet, it may include the received IP address as the destination address in the IP header of the packet. This embodiment assumes the exposure layer is cognizant of the mapping between the external Device ID used by the Application Server in the API request and the Device ID and/or Service ID. The exposure function's message for IP address assignment may include the internal Device ID and the service ID based on the mapping.

When a non-IP WTRU moves from its previously connected RAN to a new RAN, the data routing needs to be modified so that the data arrives at the new RAN. The new RAN may trigger the GW Controller to modify the outgoing and incoming routing after the WTRU registers with the new RAN, similar to what has been described herein. However, one drawback of this method is that the routing path modification by the GW Controller may introduce significant delay and cause disruption of service.

Accordingly, in one embodiment when a WTRU moves to a new RAN, the WTRU may continue to use most of the original routing path that had already been established between the previous RAN and Egress/Ingress GW, and only the hop between the previous RAN and the first routing GW is changed to the hop between the new RAN and the first routing GW. In this embodiment the "first routing GW" may be defined as the closest GW in the routing path, or if defined from the perspective of the Ingress GW to the RAN, it is the last routing GW in the path.

Figure 9:
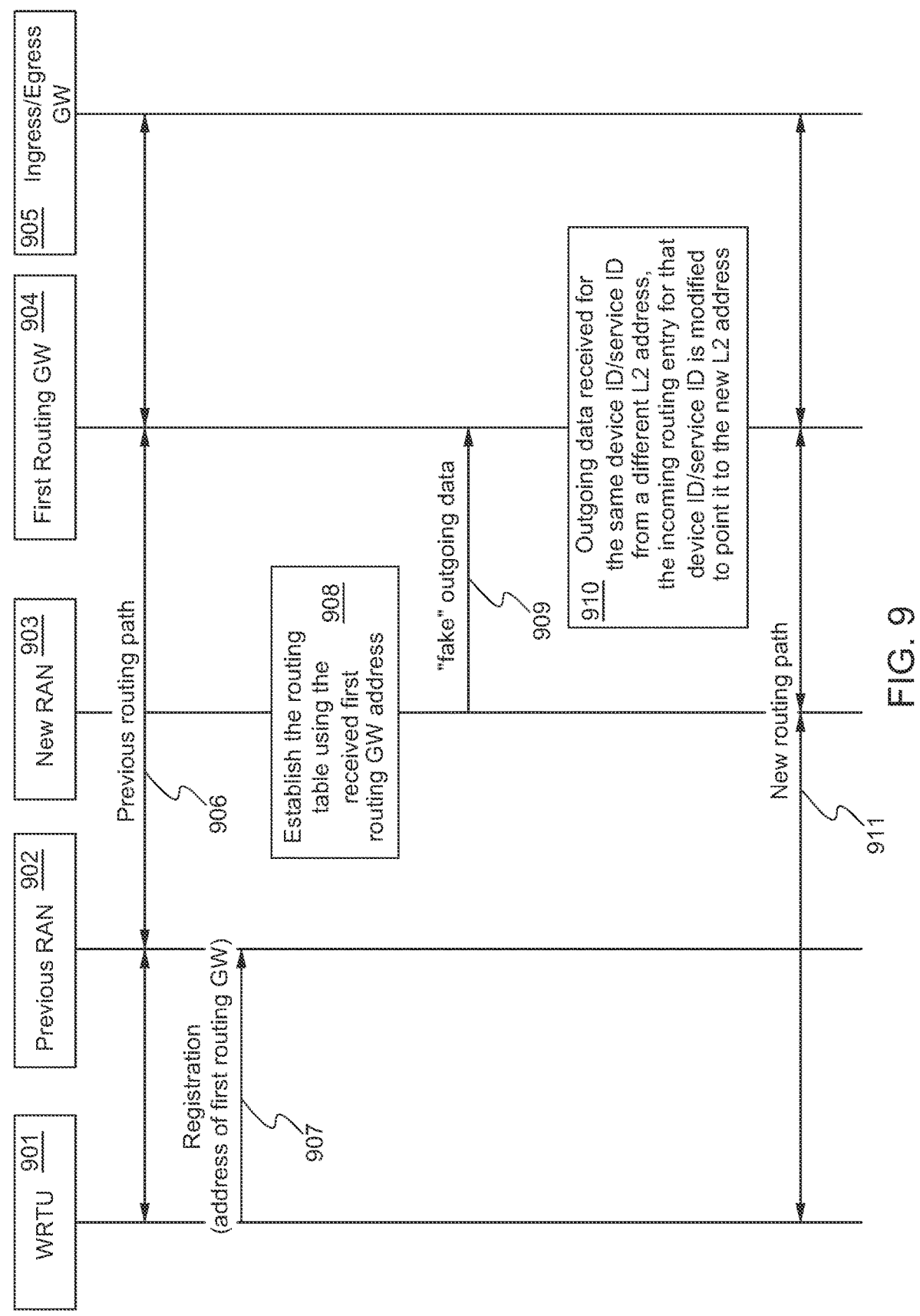
FIG. 9 shows an example method for performing fast routing path modification.

FIG. 9 shows an example method for performing fast routing path modification when a WTRU moves to a New RAN from a Previous RAN. 906 shows the previous routing path of non-IP data for WTRU 901 prior to the move to a new RAN 903. At 907, for outgoing data, the new RAN 903 receives the first routing GW address from device registration by the WTRU 901 and uses it at 908 to establish its own mapping of a routing entry and point it to the first routing GW 904 for the WTRU 901. Alternatively, the New RAN 903 retrieves the address of the WTRU's 901 first routing GW from the Previous RAN 902. At the first routing GW 904, the source of the previous hop (being either the Previous RAN 902 or the New RAN 903) does not matter because the routing is filtered with the Device ID and Service ID tag so the data is correctly forwarded to the destination without any change.

At 910 when the first routing GW 904 receives the outgoing data from a different RAN address, the first routing GW 904 modifies its downlink routing table to point it to the corresponding new RAN address. This is because the same GW is used as the "first routing GW" for both outgoing and incoming data and other routing GWs in the path may still be different for incoming and outgoing data. For the incoming data, however, the routing table at the first routing GW 904 is modified so the routing entry for the Device ID/Service ID points to the New RAN 903 instead of the Previous RAN 902. At 909, because the routing entry modification is triggered by the outgoing data, the New RAN 903 may need to send fake outgoing data to trigger routing entry modification instead of waiting for real outgoing data from the WTRU. At 911 the new routing path after the WTRU 901 has switched to the new RAN 903 is complete.

The same routing path modification procedure may be repeated when the WTRU moves to another RAN and so on. After a few modifications the original routing path may not be the most optimal path, but it should be acceptable considering that a low-mobility WTRU may roams in a limited area, infrequently, or not at all.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:
   sending a request related to sending non-IP data including an ID associated with a service that is associated with the non-IP data, wherein the request causes one or more second network nodes to perform a selection of a first network node; and
   sending the non-IP data associated with the ID associated with the service to a data network via the first network node, wherein the sending the non-IP data causes transformation of the non-IP data to an IP data packet by the first network node, wherein the transformation of the non-IP data into the IP data packet is based on an IP address associated with the ID associated with the service.

2. The method of claim 1, wherein the IP address is based on IPV6.

3. The method of claim 1, wherein the transformation is further dependent on a port number.

4. The method of claim 1, wherein the IP data packet is sent to the data network via a tunnel after it has been transformed.

5. The method of claim 1, wherein sending the non-IP data causes the one or more second network nodes to provide the IP address associated with the ID associated with the service to the first network node.

6. A wireless transmit receive unit (WTRU) comprising:
   a processor operatively connected to a transceiver, the processor and transceiver configured to send a request related to sending non-IP data including an ID associated with a service that is associated with the non-IP data, wherein the request causes one or more second network nodes to perform a selection of a first network node; and
   the processor and transceiver configured to send the non-IP data associated with the ID associated with the service to a data network via the first network node, wherein the sending the non-IP data causes transformation of the non-IP data to an IP data packet by the first network node, wherein the transformation of the non-IP data into the IP data packet is based on an IP address associated with the ID associated with the service.

7. The WTRU of claim 6, wherein the IP address is based on IPV6.

8. The WTRU of claim 6, wherein the transformation is further dependent on a port number.

9. The WTRU of claim 6, wherein the IP data packet is sent to the data network via a tunnel after it has been transformed.

10. The WTRU of claim 6, wherein sending the non-IP data causes the one or more second network nodes to provide the IP address associated with the ID associated with the service to the first network node.

\* \* \* \* \*